US009039661B2

(12) United States Patent
Becker et al.

(10) Patent No.: US 9,039,661 B2
(45) Date of Patent: May 26, 2015

(54) TUBE FOR THE ENTERAL FEEDING OF A PATIENT

(75) Inventors: Michael Becker, Knittlingen (DE); Barbara Breuer-Thal, Idstein (DE); Katharina Muennich, Usingen (DE)

(73) Assignee: FRESENIUS KABI DEUTSCHLAND GMBH, Bad Homburg (DE)

( * ) Notice: Subject to any disclaimer, the term of this patent is extended or adjusted under 35 U.S.C. 154(b) by 362 days.

(21) Appl. No.: 13/478,268

(22) Filed: May 23, 2012

(65) Prior Publication Data

US 2012/0302962 A1 Nov. 29, 2012

Related U.S. Application Data

(60) Provisional application No. 61/489,275, filed on May 24, 2011.

(30) Foreign Application Priority Data

May 24, 2011 (EP) .................................... 11167284

(51) Int. Cl.
*A01B 15/00* (2006.01)
*A61J 15/00* (2006.01)

(52) U.S. Cl.
CPC .......... *A61J 15/0015* (2013.01); *A61J 15/0038* (2013.01); *A61J 15/0026* (2013.01); *A61J 15/0069* (2013.01); *A61J 15/0065* (2013.01)

(58) Field of Classification Search
CPC ................... A61B 17/3439; A61B 2017/3484; A61B 2017/3488; A61J 15/0015; A61J 15/0019; A61J 15/0023; A61J 15/0034; A61J 15/0038; A61J 15/0046; A61J 15/0026; A61J 15/003; A61J 15/0065; A61J 15/0069; A61M 25/04; A61M 2025/0233; A61M 2039/0255; A61M 2039/0261; A61M 2210/1053; A61M 39/0247
USPC .................................. 604/104, 107, 117, 175
See application file for complete search history.

(56) References Cited

U.S. PATENT DOCUMENTS

| | | | | |
|---|---|---|---|---|
| 5,073,166 | A | 12/1991 | Parks et al. | |
| 5,248,302 | A | 9/1993 | Patrick et al. | |
| 6,350,252 | B2 * | 2/2002 | Ray et al. | 604/107 |
| 2010/0185155 | A1 | 7/2010 | McMichael et al. | |
| 2012/0116310 | A1 * | 5/2012 | Forsell | 604/151 |

FOREIGN PATENT DOCUMENTS

| | | |
|---|---|---|
| EP | 1623693 | 3/2009 |
| WO | 03/092780 | 11/2003 |
| WO | 2005/105017 | 11/2005 |
| WO | 2006/111416 | 10/2006 |
| WO | 2008/027375 | 3/2008 |

* cited by examiner

*Primary Examiner* — Kami A Bosworth
(74) *Attorney, Agent, or Firm* — Occhiuti & Rohlicek LLP

(57) ABSTRACT

A tube unit for the enteral feeding of a patient, with a tube segment that extends along at least a segment of the axial direction (S), and a retention device on the distal end of the tube segment, which extends in at least one direction radially to axial direction (S) beyond the distal end of the tube segment in an extended position and which has a smaller diameter in an elongated position, in which the retention device is elongated along axial direction (S). The retention device moves from an extended position into the elongated position is supported by a control device.

21 Claims, 19 Drawing Sheets

Figure 1:
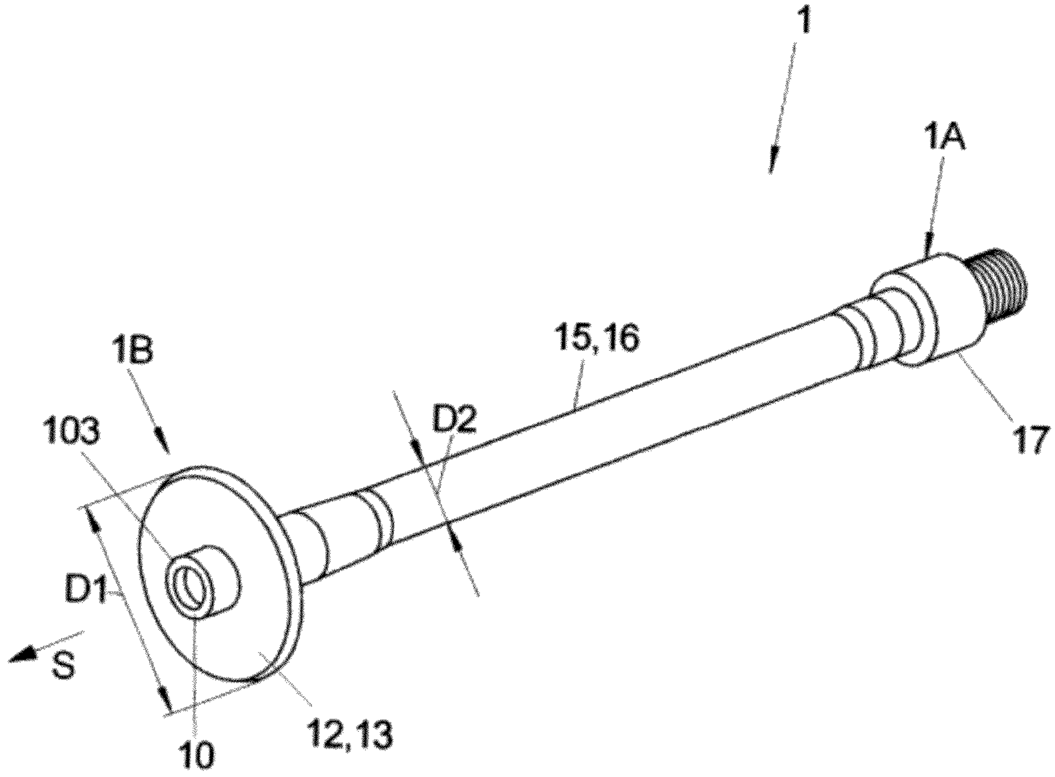

FIG 16C
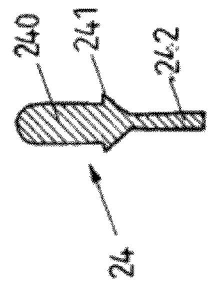
FIG 15
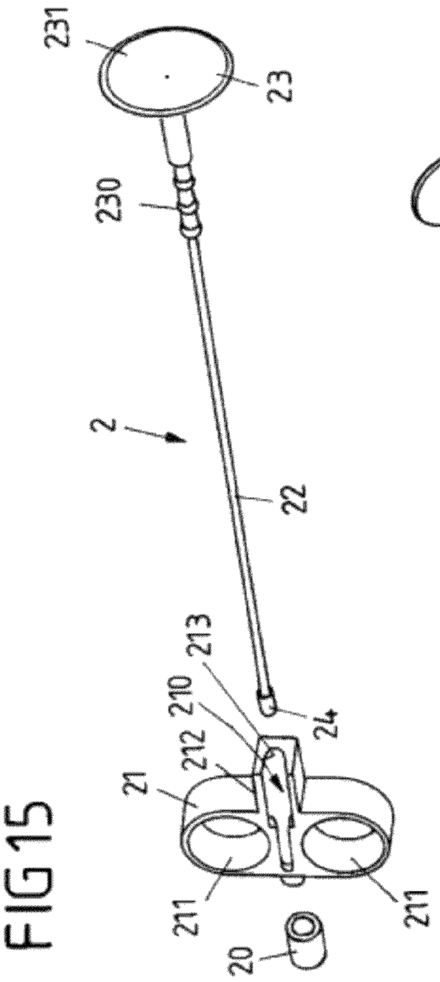
FIG 16B
FIG 16A
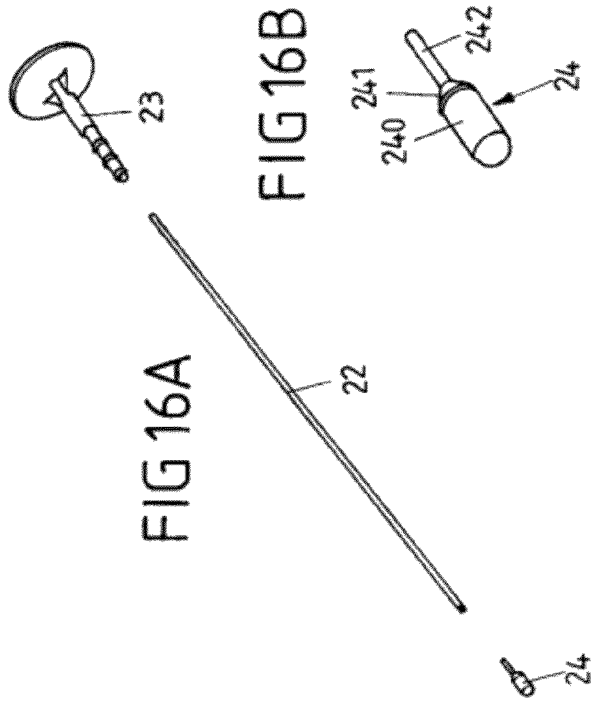

23
213
21
210
22
2

23
213
21
210
22
230
2

23
230
21
210
22
213
S
2

TUBE FOR THE ENTERAL FEEDING OF A PATIENT

CROSS REFERENCE TO RELATED APPLICATIONS

This application claims priority to European application number 11 167 284.6, filed May 24, 2011, and U.S. Provisional application No. 61/489,275, filed May 24, 2011. The contents of the aforementioned applications are incorporated herein in their entirety.

DESCRIPTION

The invention concerns a tube unit for the enteral feeding of a patient as described in the preamble of Claim 1.

Such a tube unit includes a tube segment that extends along an axial direction for at least a segment of its extent with a proximal end and a distal end and with a retention device attached to the distal end of the tube segment. The retention device has two alternative positions: In the extended position, the retention device extends beyond the distal end of the tube segment in at least one direction radially to the axial direction, whereas, in the elongated position, the retention device is elongated along the axial direction with a reduced radial diameter compared to the extended position. The retention device may be activated or deactivated by a control device by toggling from the extended state to the elongated position or vice versa from the elongated position to the extended position.

Such a tube unit may be used for the so-called percutaneous endoscopic gastrostomy (in short PEG) to secure a direct access into the stomach of a patient. The tube, which in this application is also known as a PEG tube, extends through the abdominal wall of the patient and facilitates artificial alimentation even over extended periods by providing a tube segment embodied as an elastic plastic tube that provides a port into the stomach.

PEG facilitates artificial alimentation with tube nutrients as enteral feeding via the stomach-intestine-system (as distinguished from parenteral feeding, where the feeding is done via intravenous vessels). However, a tube unit of the type described here is not limited fundamentally to PEG, but may be used for the so-called Jet-PEG or for percutaneous endoscopic jejunostomy (PEJ). For Jet-PEG, an additional smaller tube is inserted through the indwelling PEG, where its distal end extends beyond the stomach exit and the duodenum into the upper reaches of the small intestine (the so-called jejunum). PEJ uses a direct insertion into the jejunum.

The method for inserting a PEG tube for enteral feeding that is used most frequently today is the so-called thread pulling method. A thread is inserted here via a cannula into the stomach of the patient, where this thread is then secured by an endoscope inserted via the mouth and esophagus of the patient and pulled out through the esophagus and the mouth of the patient. The tube to be inserted is then attached to this thread, and the tube is pulled through the mouth, the esophagus, the stomach and a port in the abdominal wall by pulling on the end of the thread extending from the abdominal wall, until the tube has reached the designated position on the abdominal wall.

In order to preclude the tube from exiting through the abdominal wall, tube units inserted by the thread pulling method have a retention device that consists of a plastic plate that is firmly attached to the distal end of the tube, which prevents the tube from slipping out through the port and which comes to rest on the interior surface of the stomach wall.

The thread pulling method has been used successfully in the past in many applications. However, the insertion of the tube by means of the thread pulling method is comparatively rather involved, and the removal of the tube may be difficult, if the tube is no longer needed for enteral feeding of the patient or if the tube is to be replaced after extended use.

For example, it is feasible to cut the tube outside the stomach and to push the protruding end of the tube into the stomach, where the items (the distal end of the tube and the associated retention device) will then be voided via the intestine. Alternatively, another gastroscopy could retract them via the esophagus by capture in forceps. The first method has a higher danger of intestinal obstruction because the plastic materials are travelling through the intestine. The second method is more costly, specifically by requiring another gastroscopy.

In order to simplify the insertion and also the removal of a tube, so-called exchange tubes are known where, for example, an inflatable and deflatable balloon is used as a retention device. Such tubes facilitate the insertion and removal without endoscopic gastroscopy.

The tube published in EP 1 623 693 B1 has a retention device on the distal end of a segment of the tube that has a round or pyramidal shape in the extended state and that can be elongated by use of the control device to the extent that it can be inserted simply in its elongated state through a port in the abdominal wall into the stomach or that it can be withdrawn from the stomach to replace the tube. The retention device consists of an elastic and deformable material and contains various strips that bend to power the movement of the retention device from the elongated position to the extended position.

The tube is inserted or replaced by compressing the control device in an appropriate manner, such that the tube can be inserted through the port in the abdominal wall with the retention device in its elongated position. Once the tube has been inserted through the port in the abdominal wall, the control device is removed from the tube and the spring action of the retention device enlarges the retention device into the extended position, such that the radial diameter of the retention device exceeds the diameter of the tube, thus preventing the tube from slipping through the abdominal wall.

Other tubes of this type are known, for example, from U.S. Pat. No. 5,248,302, from WO 2005/105 017 A1 and from WO 2006/111 416 A1.

Previously known retention devices for exchange tube systems use elastic components, where strips and the discontinuity of the surface thus induced create an elasticity that permits a change from the extended position to an elongated position and an elastic return to the extended position.

For tubes for enteral feedings inserted into a patient percutaneously, it is also necessary to ensure that the components of the retention device that are in contact with the stomach wall will not grow into the stomach wall (the so-called buried-bumper-syndrome) or that the opposite stomach wall is not irritated. This is a higher degree of danger for retention devices that have a discontinuous surface design with ports and strips. Known retention devices have therefore relatively large dimensions that are intended to assure that non-contiguous areas of the surface of the retention device have some separation from the stomach wall. As a result, the retention device requires considerable space in the stomach, which may be disadvantageous.

The present invention has the objective of providing a tube unit for the enteral feeding of a patient that assures a simple insertion and a simple removal of the tube.

This objective is solved by a device with the characteristics of Claim 1.

The invention is described as a tube unit for the enteral feeding of a patient with a tube segment that extends at least partly in the axial direction with a proximal end and a distal end, where the distal end of the tube segment has a retention device with a radial dimension in an extended position that exceeds the radial dimension of the distal end of the tube segment in at least one direction radial to the axial direction and with a reduced radial dimension in an elongated position when the retention device is elongated, where a control device effects the change from the extended position to the elongated position.

The proximal end is defined here as the end of the tube segment or of the exterior tube and the interior tube that is not inserted into the patient when the tube has been inserted and that may be connected to a transfer system or a feeding material container. In contrast, the distal end is defined as the end that is inserted into the interior of the patient, normally into a hollow organ, when the tube has been inserted. Enteral feeding is defined with regard to a liquid containing nutrients and/or drugs.

The invention is characterized in particular by having the tube segment embodied as an exterior tube, where an interior tube is inserted into the exterior tube with a proximal end and a distal end, where the distal end of the interior tube is connected to the control component and that it is elastic in the axial direction such that the control component can move along the axial direction relative to the exterior tube to toggle the retention device from an extended position to the elongated position.

Alternatively or in addition, the invention may also be characterized by having the retention device equipped with a support structure with a sleeve that surrounds the support structure. Such a tube facilitates the use of a retention device that can be activated and deactivated, if space is limited. Furthermore, it locks the tube into position, when the tube is inserted. The characteristics listed above may then describe one possible embodiment.

As is true for the exterior tube, the interior tube has a proximal end and a distal end, where the proximal ends of the exterior tube and the interior tube are specifically connected to the proximal end of the tube unit.

The distal end of the exterior tube is connected to the end of the support structure and the sleeve furthest from the control device, whereas the distal end of the interior tube is connected to the control device that can move relative to the exterior tube. The interior tube is here elastic relative to the axial direction, such that the control component can be moved relative to the exterior tube along the axial direction to move the retention device from the extended position to the elongated position. In order to move the retention device from the extended position to the elongated position, the control device exerts force within the interior tube, such that the control device is moved axially and is moved further away from the distal end of the exterior tube, such that the retention device with its support structure and sleeve is elongated and such that the interior tube that is connected to the control device is stretched in an elastic manner. In the elongated position of the retention device, the interior tube is under elastic tension and exerts a reverting force on the retention device in the direction of its extended position, such that the retention device will automatically revert to its extended position due to the tension on the interior tube as well as the elasticity of the support structure, if applicable, once the control device no longer applies force to the retention device.

The tube, specifically diameter D1 of the tube, may vary in size depending on the needs of the application or the required external diameter of the catheter. The elasticity of the interior tube in the axial direction conforms to the characteristics, specifically diameter D1, of the tube in the extended position. Specifically, the elasticity of the interior tube in the axial direction will be chosen such that it can be stretched in the axial direction by at least one length, such that the diameter of the tube in the elongated position is reduced to the point that the tube can be inserted into the patient through a port. For example, the interior tube can be stretched by at least a length of roughly D1 in the axial direction.

The tube unit thus uses two coaxially situated tubes that are not connected in the axial direction, namely the exterior tube and the interior tube axially housed within it. The interior tube may be designed here for transmission of the application fluids to be administered, specifically a liquid containing nutrients and/or drugs. It may thus be connected to permit flow from a port of the proximal end component to a port of the distal control device. It is advantageous that the interior tube will not leak into the exterior tube, such that all of the flow of an application liquid is contained within the interior tube.

It is preferable that the retention device is incorporated radially outside the interior tube, such that the application liquid does not contact the retention device, specifically the support structure. The support structure is thus protected from the interior tube on the inside and from the sleeve and the exterior tube on the other side, such that the support structure is held in secured space between the interior tube and the sleeve.

One embodiment uses an exterior tube with an outer diameter ranging from 3 mm to 20 mm, preferably from 4 mm to 12 mm, particularly preferably from 4 mm to 8 mm. The interior tube has a smaller outer diameter than the interior diameter of the exterior tube. In particular, the thickness of the wall of the exterior tube and/or the interior tube is 0.1 mm to 2 mm, preferably 0.2 mm to 1 mm.

One embodiment uses a retention device with a support structure and a sleeve surrounding the support structure.

This embodiment of the invention starts from the idea of using a retention device with a support structure to provide the required structural strength and rigidity to hold the tube in the designated position when inserted, on the one hand, and with a sleeve surrounding the support structure, on the other hand. The support structure is designed here such that forces pulling on an inserted tube can be handled, for example, when the support structure can handle a retaining force of more than 25 N. The surrounding sleeve encloses the support structure and covers it, such that the sleeve presents a contiguous surface that facilitates an advantageous contact between the retention device and, for example, an interior stomach wall, where the risk that the retention device will grow into the stomach wall is reduced even for long-term use of a tube for enteral feeding (it is not unusual that a tube for enteral feeding may remain in position for substantially longer than a year). The support structure and the sleeve surrounding the support structure are designed to be free to move relative to each other. They are not glued to each other. They can slide within each other.

For example, the support structure may consist of several separate fibers or of a web produced with one continuous fiber. The several separate fibers or the continuous fiber thus create a woven structure that provides sufficient rigidity and strength to offset the forces acting on the unit when the retention device is extended. The web has a number of points where the fibers cross. The fibers are not glued together at these fiber crossing points. They may glide past each other.

The fibers may be thermoplastic, such as polyester, specifically poly (ethylene terephthalate) (PET), and/or textile fibers.

In another embodiment, the retention device has a bellows with a proximal and a distal interior surface and a spacer within the bellows between the proximal interior surface and the distal interior surface of the bellows. The spacer keeps the proximal interior surface and the distal interior surface interior of the bellows apart when the tube is compressed. The bellows will not collapse completely. Thus, there will always be air in the interior of the bellows. It forms a kind of air cushion. The bellows with the thus formed air cushion supplies the required strength and rigidity to hold the tube in its designated position when installed, on the one hand. On the other hand, the bellows provides an enveloping sleeve. Thus, the bellows represents a support structure as well as a sleeve, specifically with the advantages listed above for such a support structure and a sleeve. One embodiment provides for a spacer in the form of a preferably two-stage sleeve, which is pushed onto the distal end of the interior tube.

It is advantageous that the sleeve and/or the bellows consist of a biocompatible material, such as silicone or a compound containing silicone and polyurethane. Given that the sleeve includes the support structure and/or the bellows includes the spacer, which will preclude a contact of the support structure with the stomach wall, the system provides an advantageous and biocompatible type of retention device against the stomach wall (or any other wall of a hollow organ in another use of the tube).

The sleeve and the support structure are provided specifically as separate components, where the support structure is provided within the sleeve and is hermetically sealed within the sleeve. The spacer and the bellows are provided specifically as separate components, where the spacer is provided within the bellows and is hermetically sealed within the bellows.

It is advantageous that the retention device in the extended position has an essentially circular exterior shape that is concentric to the distal end of the tube segment, viewed in a top view along the axial direction. It is preferable that the retention device in the extended position has a flat and plate-like shape that lies flat against the interior wall of the stomach with a diameter larger than the diameter of the tube segment at its distal end.

The larger diameter of the retention device precludes the tube from slipping through the stomach wall (or the wall of the organ in question). The flat and plate-like shape of the support structure consisting of a web and the surrounding sleeve implies that the retention device requires not much space when the system is in place.

One end of the support structure and the sleeve and/or the bellows and the spacer may be connected to the distal end of the tube segment, and the other end may be connected to the control device that is movable relative to the distal end of the tube segment. During insertion of the tube, the control device may be moved such that the retention device and its support structure are held in the elongated position, thus reducing the radial dimension of the retention device for an easier insertion of the tube. Once the tube has been inserted, the pressure on the control device is relaxed, such that the elastic tension or, if needed, application of other force will move the control device closer to the distal end of the tube segment, such that the retention device moves from the elongated position to the extended position to hold the tube unit in the designated position.

Figure 2B:
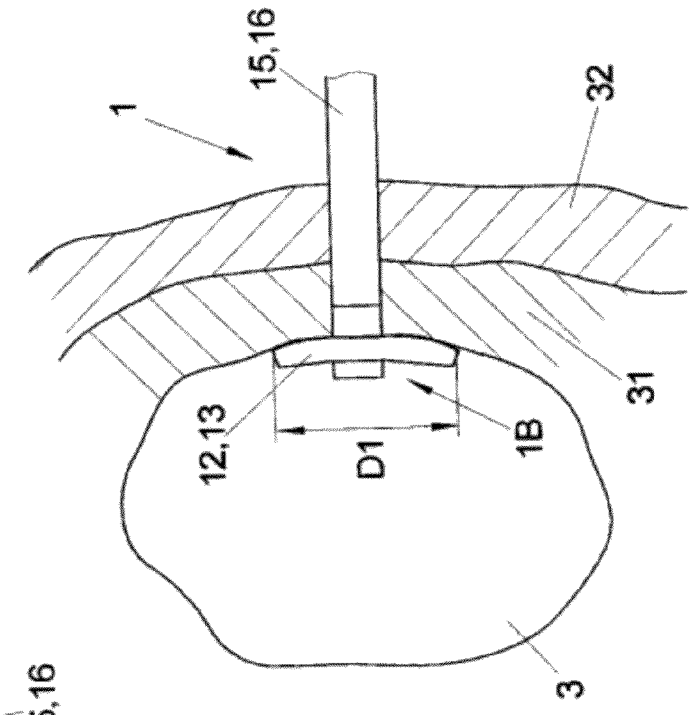
Figure 2A:
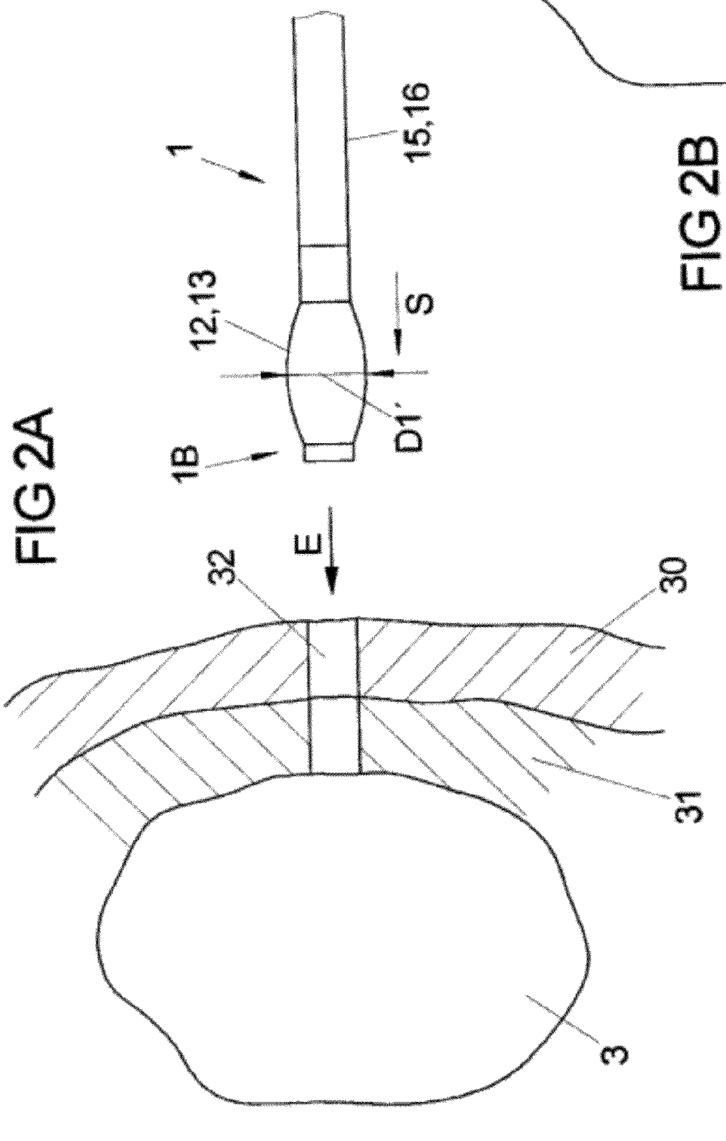
Figure 3:
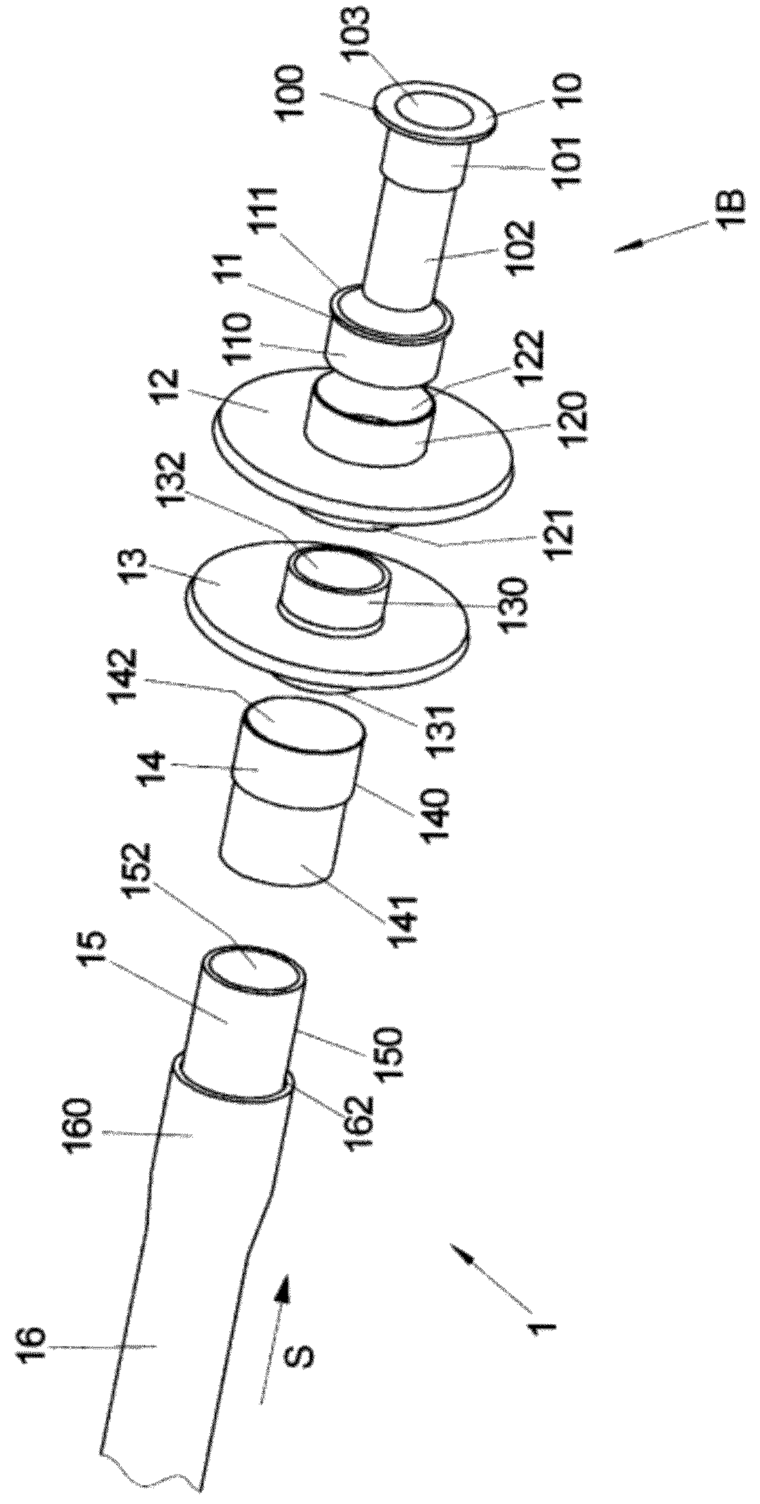
Figure 4B:
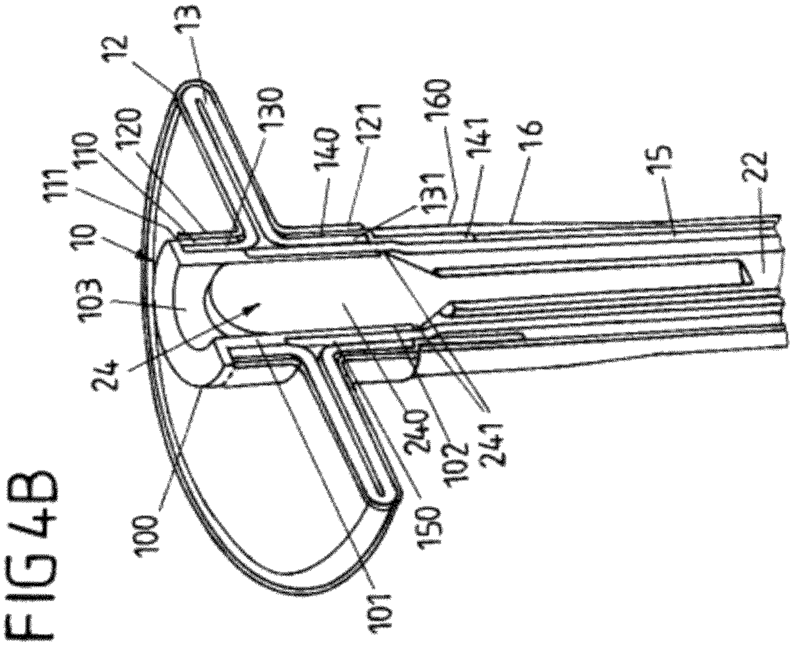
Figure 4A:
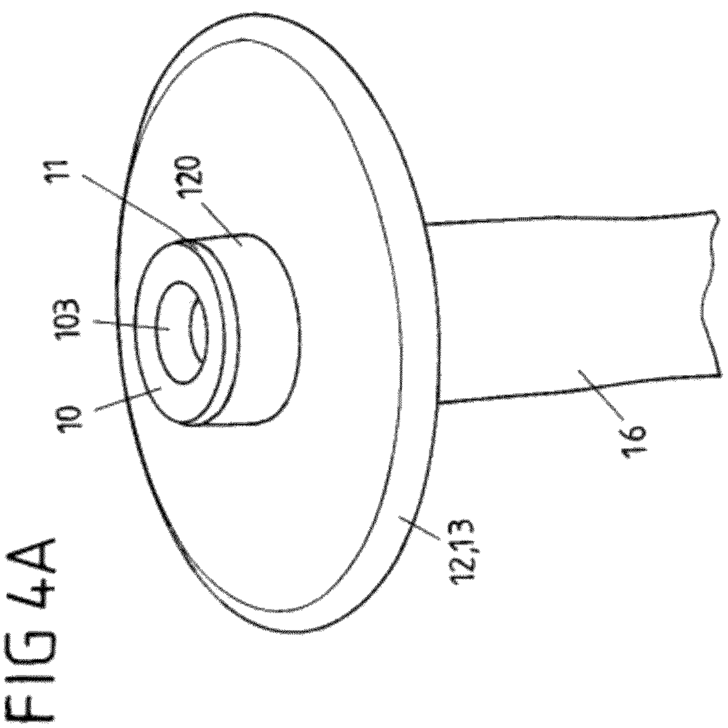
Figure 5A:
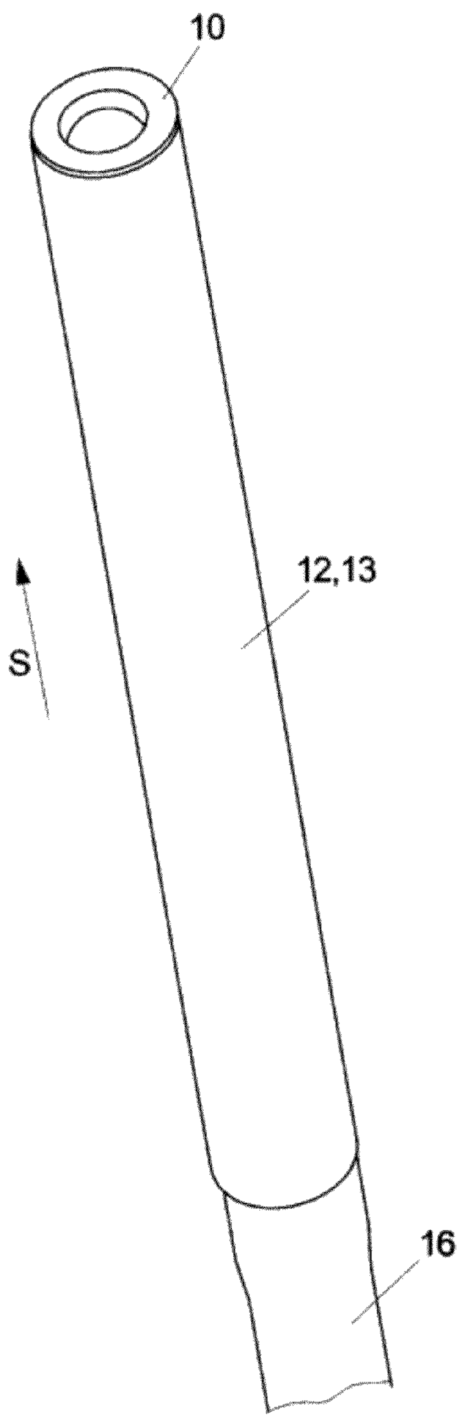
Figure 5B:
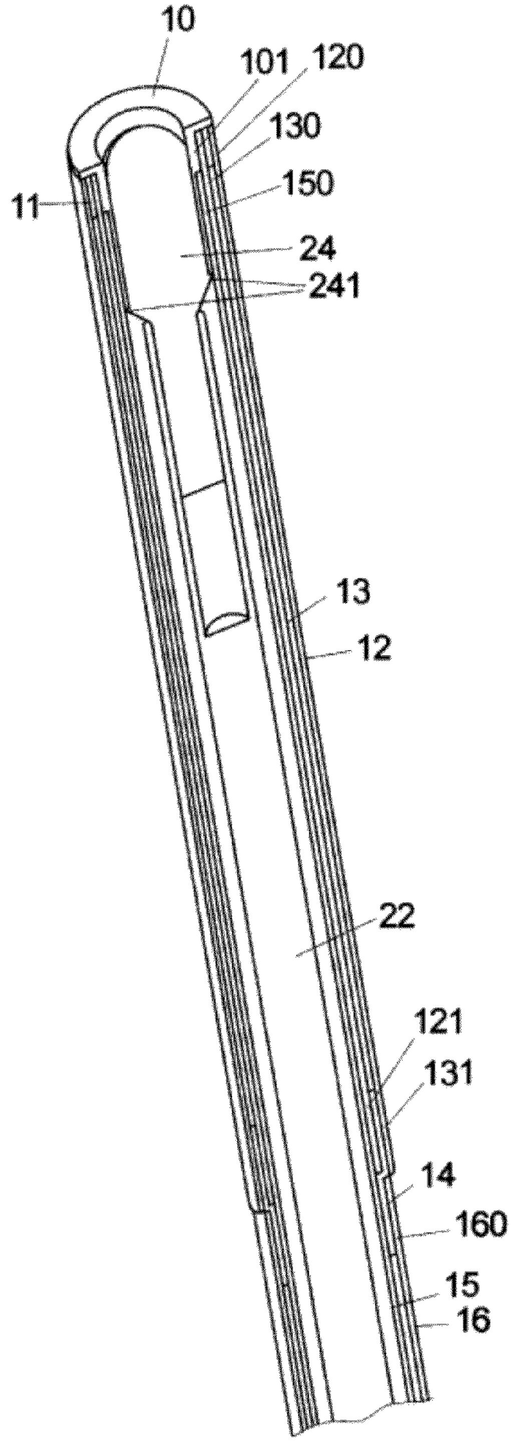
Figure 6A:
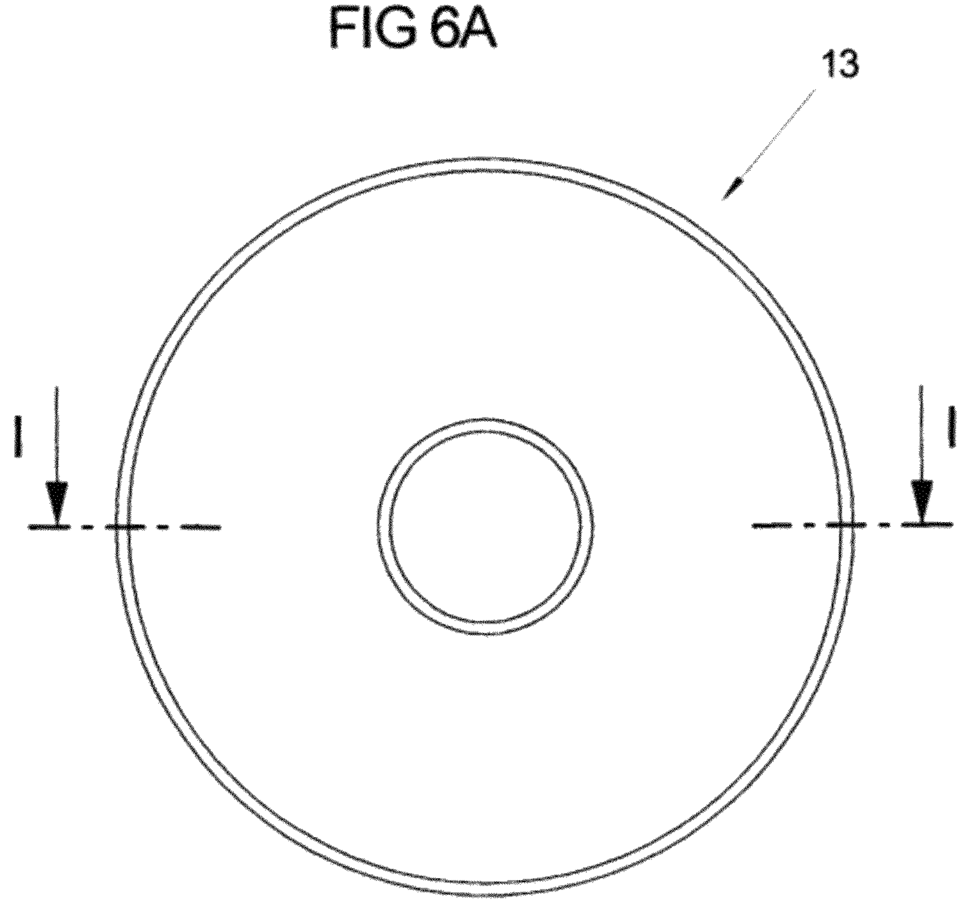
Figure 6B:
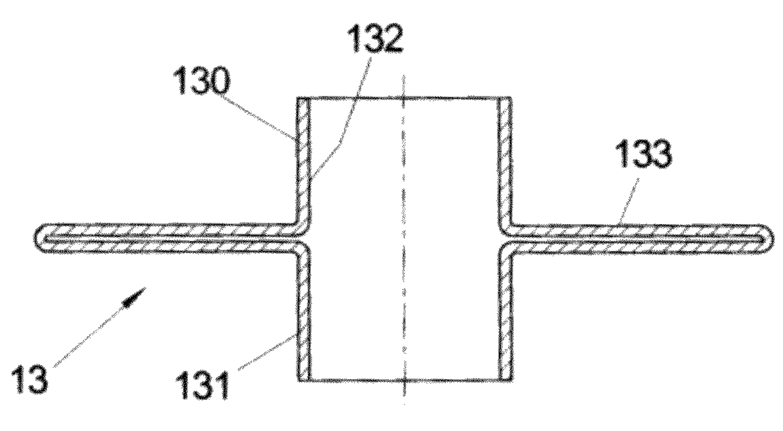
Figure 6C:
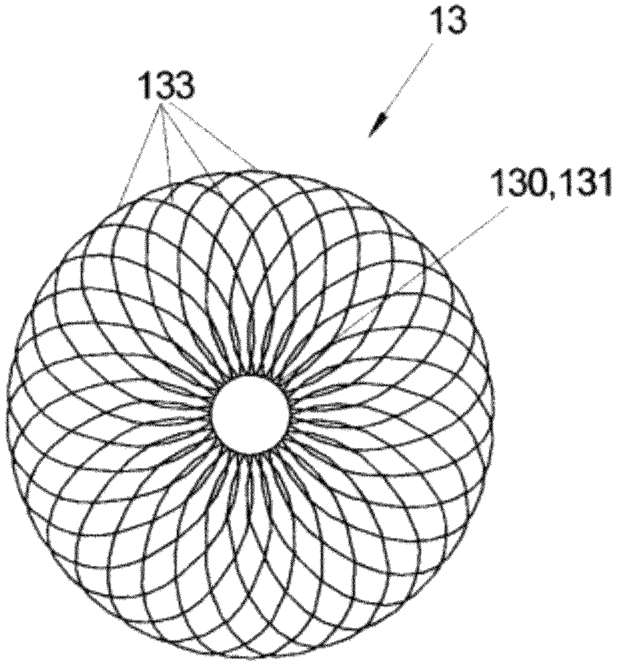
Figure 7A:
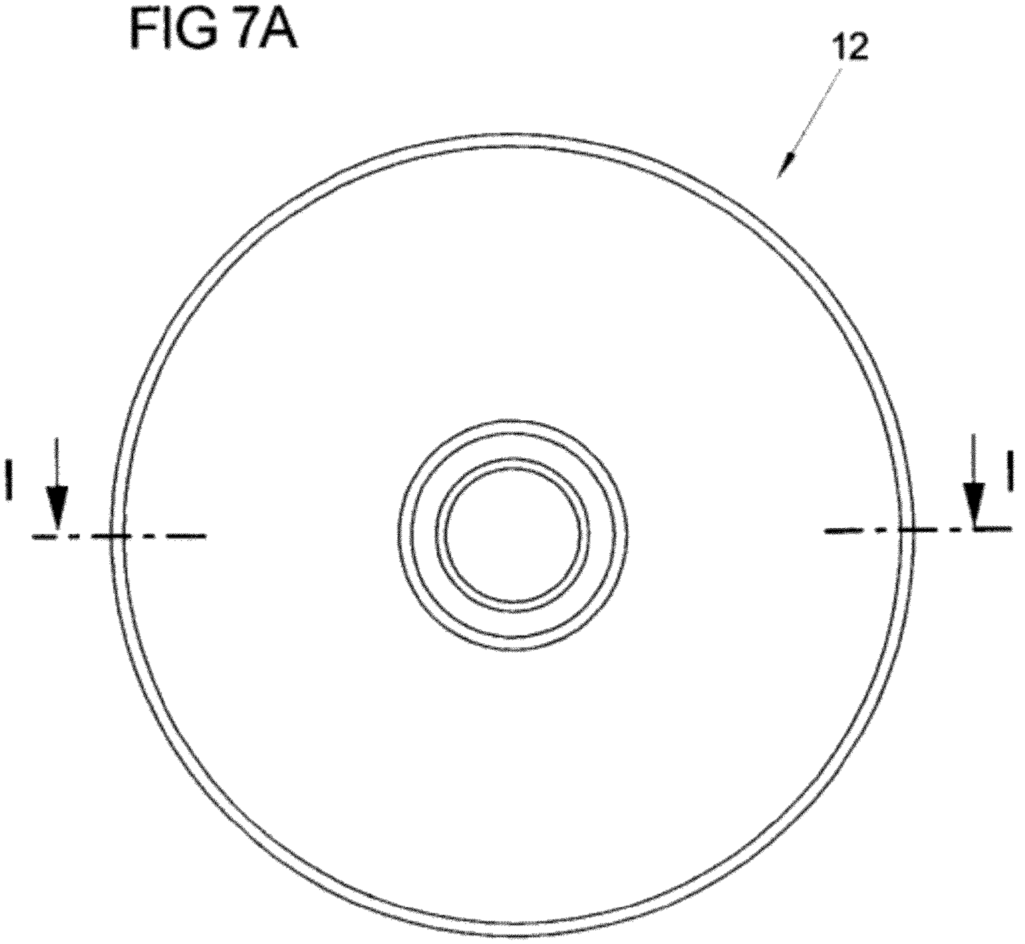
Figure 7B:
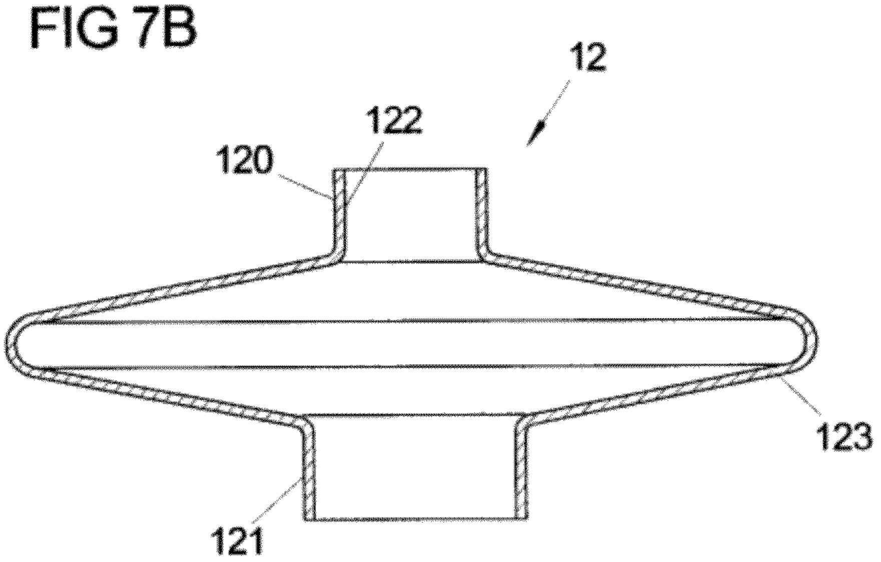
Figure 8B:
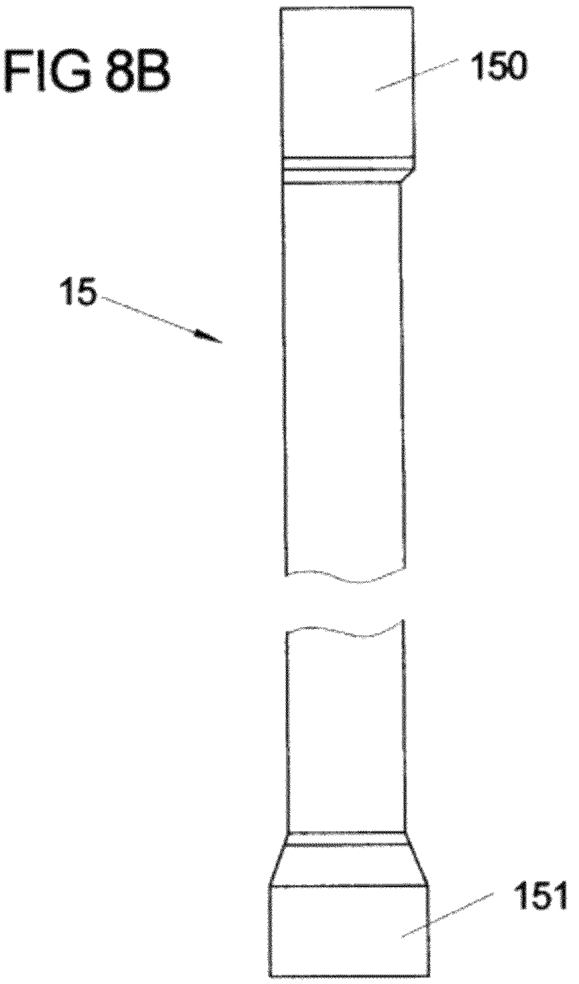
Figure 8A:
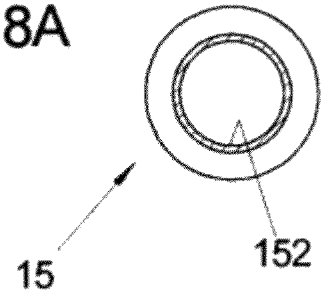
Figure 9B:
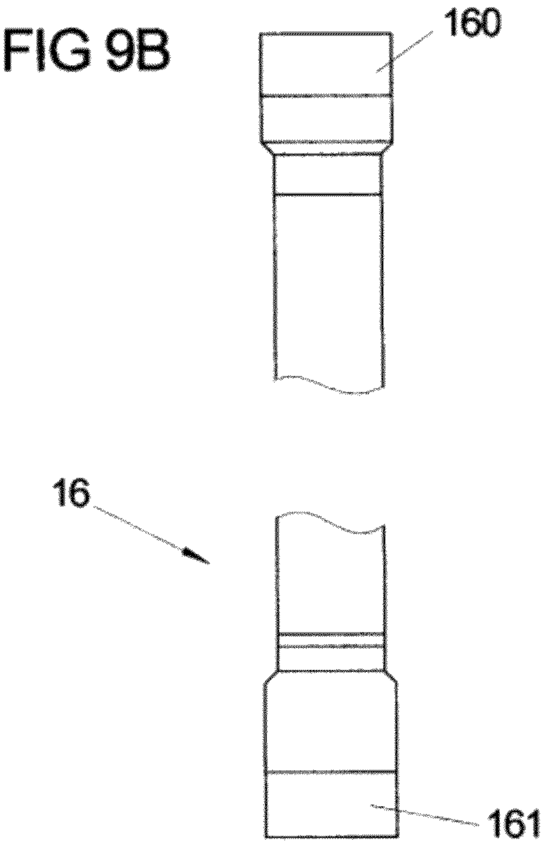
Figure 9A:
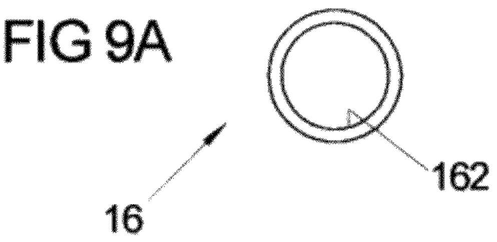
Figure 10B:
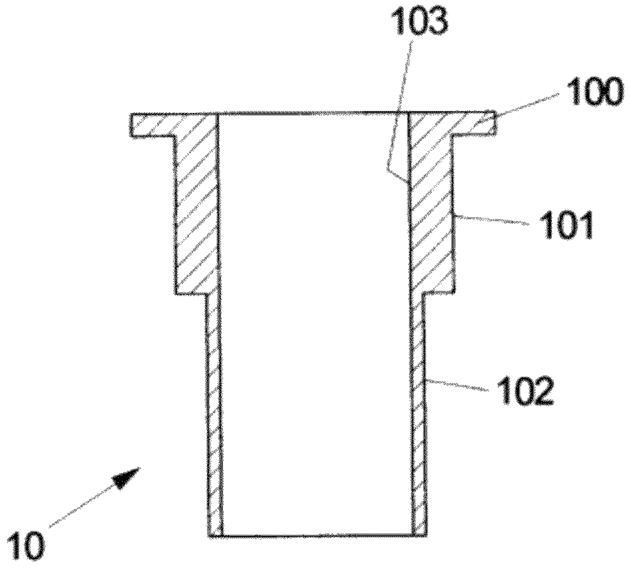
Figure 10A:
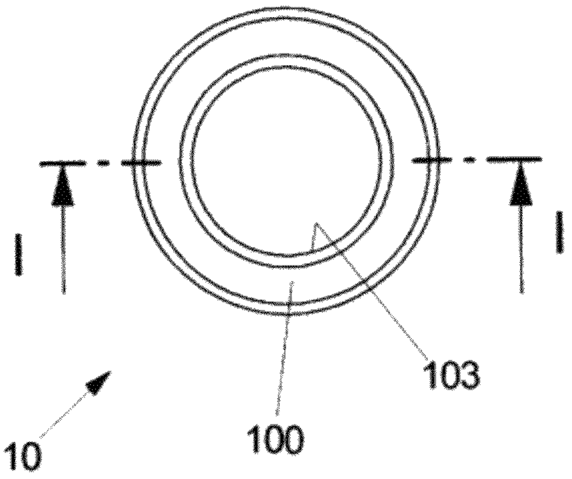
Figure 11B:
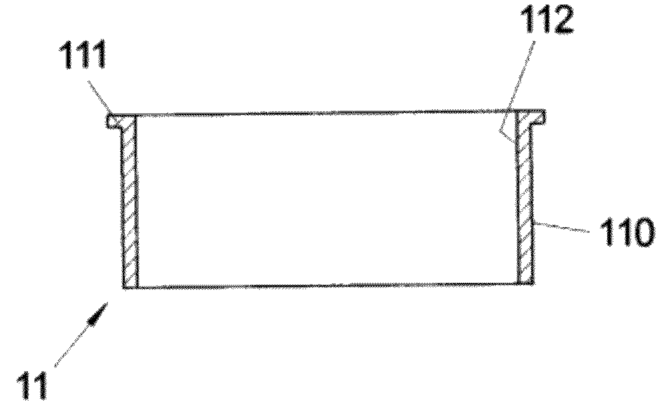
Figure 11A:
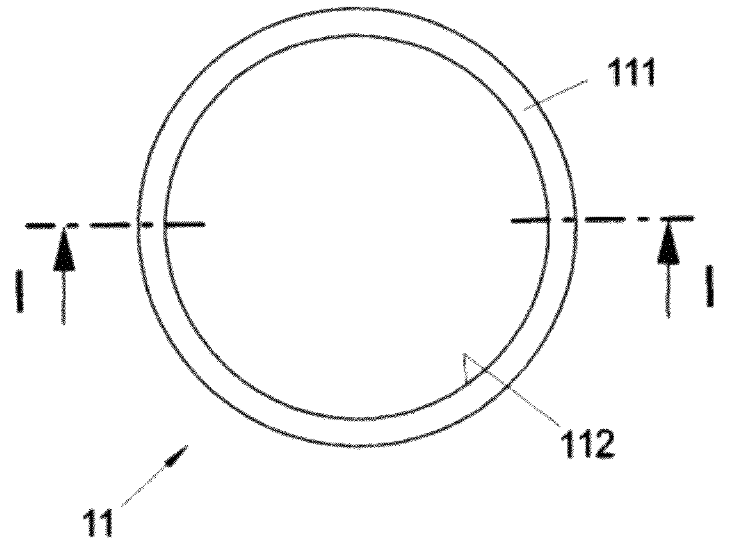
Figure 12B:
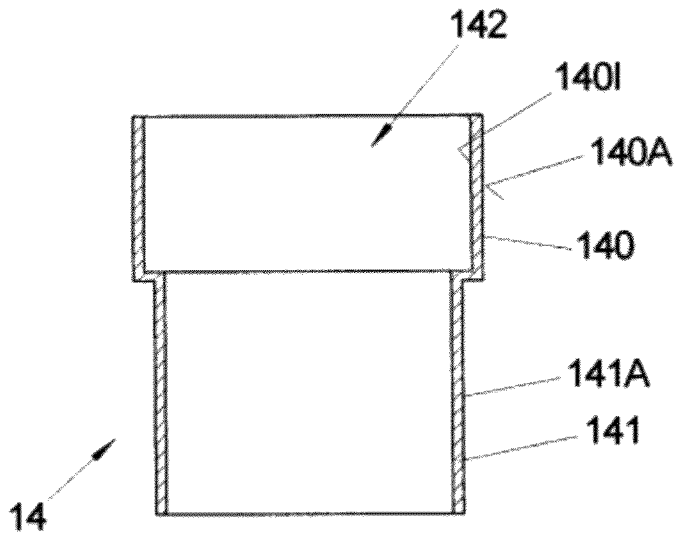
Figure 12A:
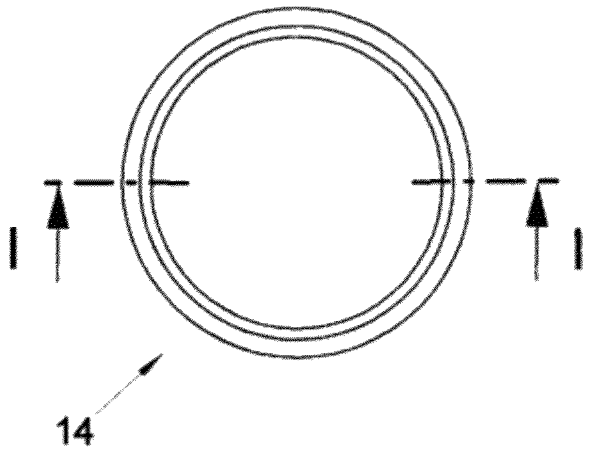
Figure 13B:
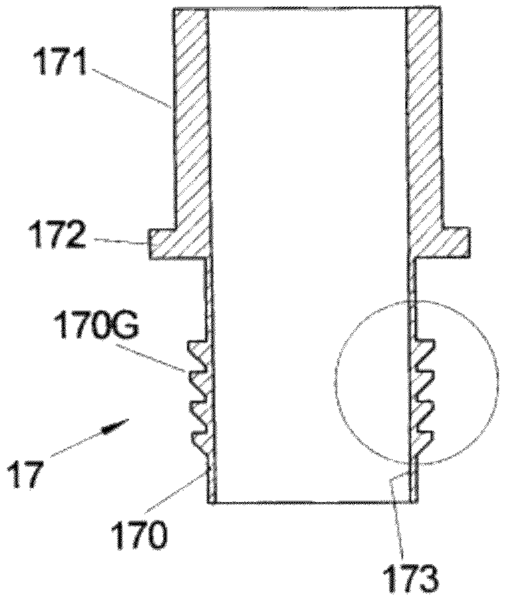
Figure 13C:
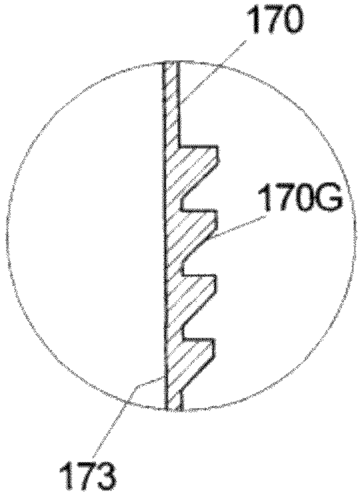
Figure 13A:
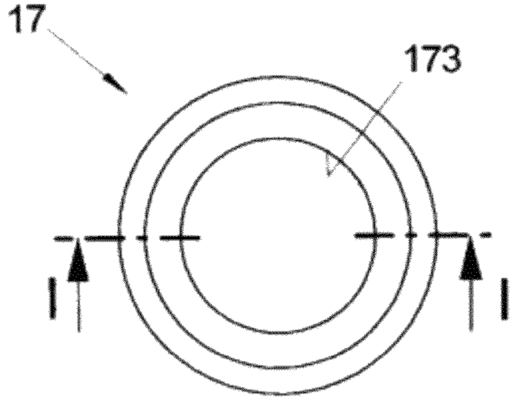
Figure 14:
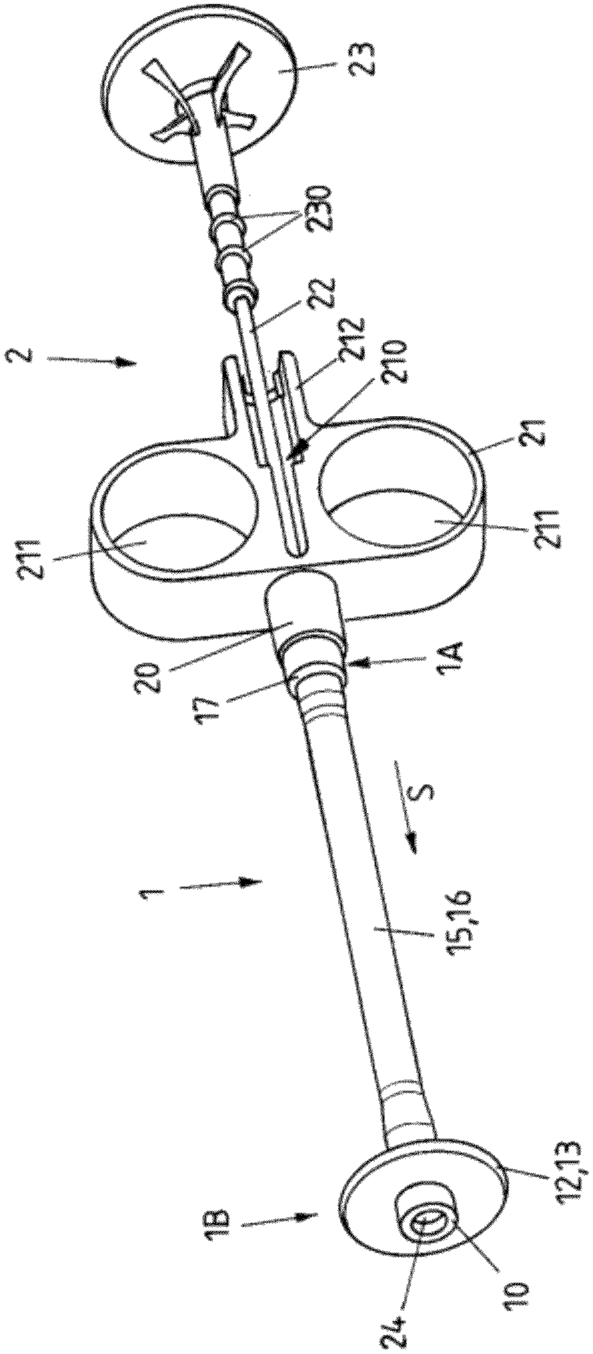
Figures 17A, 17B, 17C:
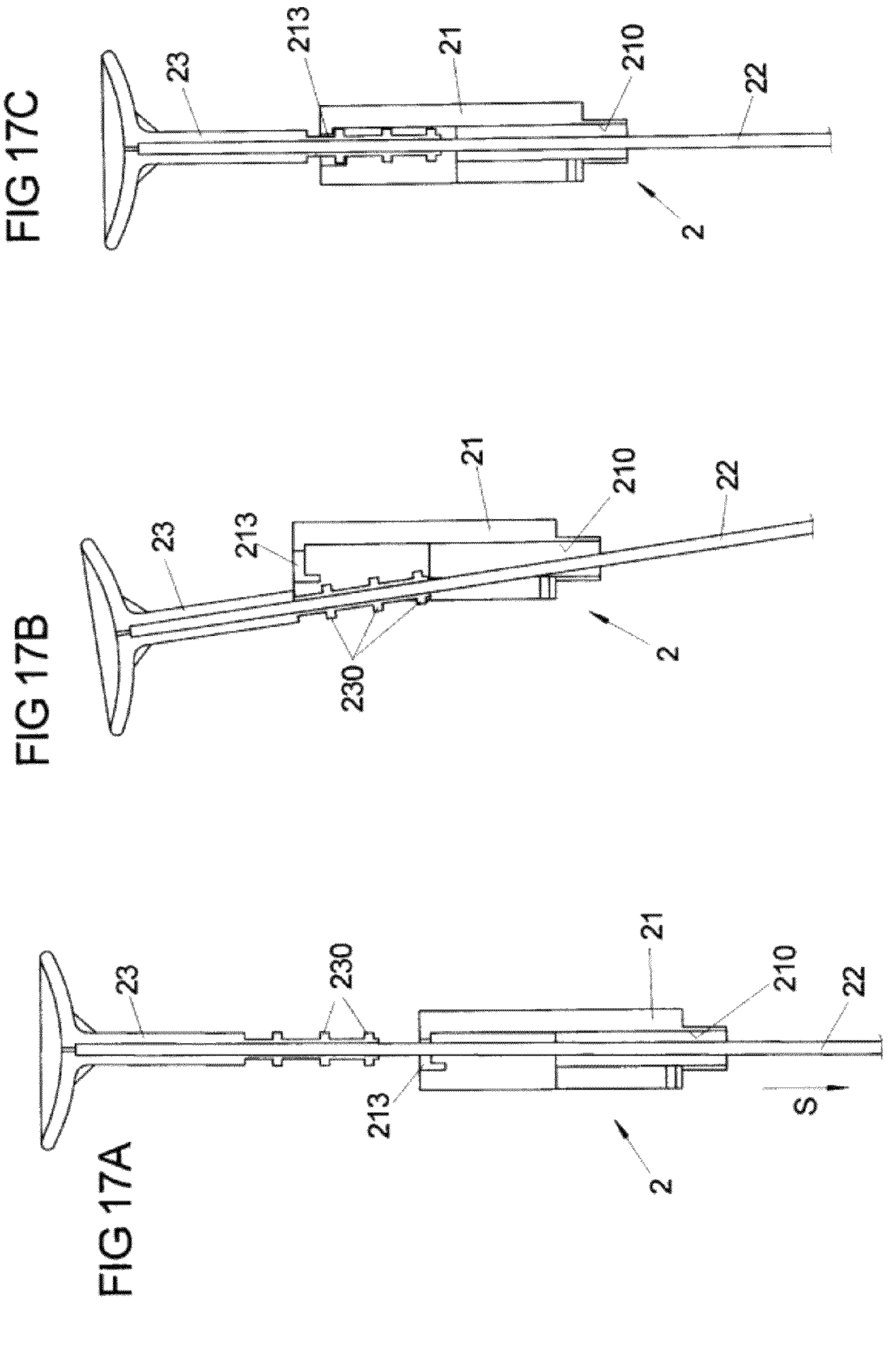
Figure 18A:
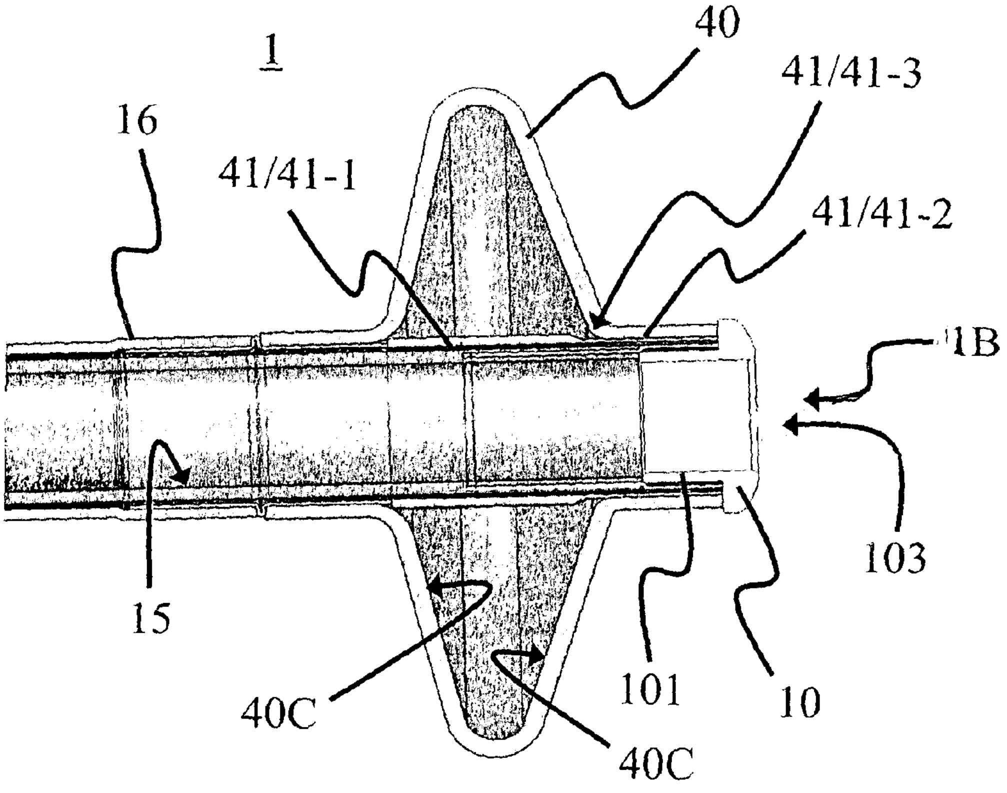
Figure 18B:
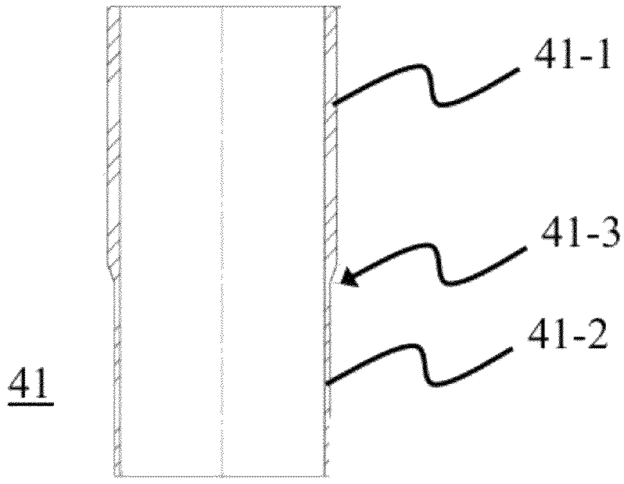

The idea underlying the invention will be explained in more detail in the following by reference to the embodiments shown in the Figures. They show:

FIG. 1 a general view of a tube unit;

FIG. 2A a schematic view of a tube unit prior to insertion;

FIG. 2B a schematic view of a tube unit after insertion;

FIG. 3 an enlarged view of the distal end of the tube unit;

FIG. 4A a view of the distal end of the tube unit with a retention device in the extended position;

FIG. 4B a cross-section of the system shown in FIG. 4A;

FIG. 5A a view of the distal end of the tube unit with the attached retention device in an elongated position;

FIG. 5B a cross-section of the system shown in FIG. 5A;

FIG. 6A a top view of a support structure of the retention device;

FIG. 6B a cross-section of the support structure along line I-I in FIG. 6A;

FIG. 6C a schematic depiction of the web structure of the support structure;

FIG. 7A a separate top view of a sleeve of the retention device;

FIG. 7B a cross-section of the sleeve along line I-I in FIG. 7A;

FIG. 8A a top view of an interior tube of the tube unit;

FIG. 8B a side view of the interior tube of FIG. 8A;

FIG. 9A a top view of an exterior tube of the tube unit;

FIG. 9B a side view of the exterior tube of FIG. 9A;

FIG. 10A a top view of a control device of the tube unit;

FIG. 10B a cross-section of the control device along line I-I in FIG. 10A;

FIG. 11A a top view of a distal sleeve of the tube unit to connect to the control device;

FIG. 11B a cross-section of the distal sleeve along line I-I in FIG. 11A;

FIG. 12A a top view of a centering sleeve to connect the exterior tube to the retention device;

FIG. 12B a cross-section of the centering sleeve along line I-I in FIG. 12A;

FIG. 13A a top view of a proximal end segment of the tube unit;

FIG. 13B a cross-section of the proximal end segment along line I-I in FIG. 13A;

FIG. 13C an enlarged segment of FIG. 13B that shows the teeth on a cylindrical segment of the proximal end segment;

FIG. 14 a view of the tube unit with an attached control device to operate the retention device;

FIG. 15 an exploded view of the control device;

FIG. 16A an exploded view of a mandrin of the control device;

FIG. 16B a view of a head of the mandrin in FIG. 16A;

FIG. 16C a side view of the head in FIG. 16B;

FIG. 17A a partial cross-section of the control device prior to operating the retention device from the extended position;

FIG. 17B a partial cross-section of the control device during the movement from the extended position to the elongated position;

FIG. 17C a partial cross-section of the control device after moving the retention device into the elongated position;

FIG. 18A a cross-section of a tube unit with a bellows and a spacer within the bellows in an assembled state;

FIG. 18B a cross-section of a two-level spacer and

Figure 18C:
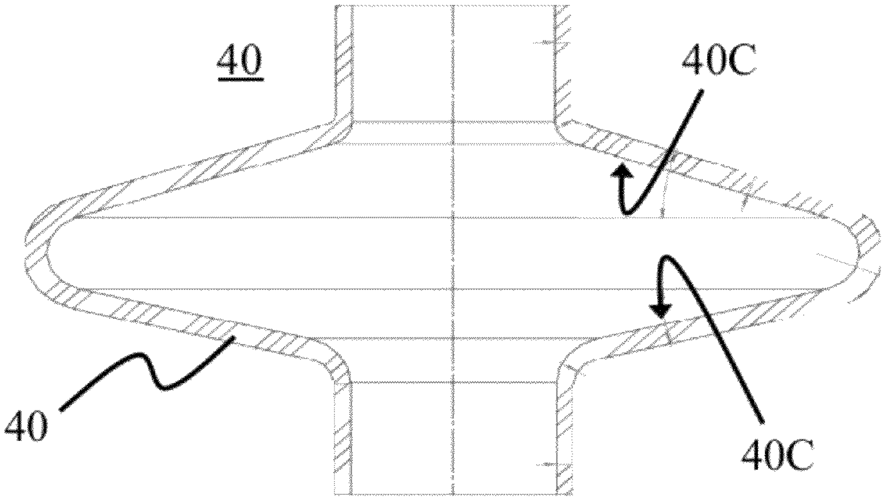

FIG. 18C a cross-section of a bellows surrounding a spacer.

FIG. 1 shows a view of tube unit 1, which may be used for the enteral feeding by providing direct access to the stomach or intestine of a patient, for example, by a percutaneous port through the stomach or intestine wall of the patient. For this purpose, tube unit 1 includes a system of tubes, including exterior tube 16 and interior tube 15, which are connected to proximal end segment 17 at their proximal ends and to retention device 12, 13 at their distal ends. Distal end 1B of tube 1 is designed to insert into a port in the abdominal wall of the patient, whereas proximal end 1A of tube 1 remains external to the patient, when the tuba unit is in place, such that proximal end segment 17 may be used to connect tube 1 to a transfer system or, for example, to a container containing nutrient liquids to feed the patient enterally.

Retention device 12, 13 serves to hold the installed tube 1 in its designated position and to prevent the tube from sliding out through the abdominal wall. Retention device 12, 13, the structure and function of which will be explained in detail below, has an extended position (depicted in FIG. 1), in which it has a plate-like, flat and essentially spherical form with diameter D1, which exceeds diameter D2 of exterior tube 16 of the tube unit 1 in the vicinity of distal end 1B.

FIGS. 2A and 2B show the essential steps for the insertion of tube unit 1. In order to insert the distal end 1B of tube 1 through port 32 in dermal layer 30 and stomach wall 31, retention device 12, 13 is elongated along axial direction S in which tube 1 essentially extends by a force acting on a control device embodied as an obturator (to be explained below), such that diameter D1' of retention device 12, 13 and thus the size of retention device 12, 13 in a radial direction is reduced, which facilitates the insertion of distal end 1B of tube 1 without difficulty in a direction of insertion E through port 32 into stomach 3 of a patient. (Tube unit 1 will be described in the following by use of a PEG tube. However, tube unit 1 may also be used, for example, as a Jet-PEG or PEJ tube.)

Once tube 1 is in the designated position with distal end 1B in stomach 3 of the patient, elastic forces (to be described below) return retention device 12, 13 to its extended position, such that retention device 12, 13 once again has a larger radial extent with diameter D1 and comes into contact with the interior surface of stomach wall 31. The distal end 1B of tube 1 can then not be removed from stomach 3 and will be held in position in stomach 3 by the extended retention device 12, 13.

If tube 1 is to be replaced, retention device 12, 13 may again be elongated, as depicted in FIG. 2A, by the actions of a suitable control device, such that distal end 1B of tube 1 can be removed from stomach 3 without requiring an endoscopic procedure (the so-called gastroscopy).

FIG. 3 to 13 are intended to explain the details of an embodiment of tube unit 1 with retention device 12, 13. Then, FIG. 14 to 17 are intended to show the use of a control device to operate retention device 12, 13, where it must be noted that the device is not a component of tube 1, but is rather only attached to tube 1 in order to operate retention device 12, 13 by moving retention device 12, 13 from its extended position to the elongated position. Finally, FIG. 18A to 18C show another embodiment of a tube with retention device 40 and 41. The comments made regarding FIG. 14 to 17 also apply to this embodiment.

FIG. 3 to 5 show general views of the distal end 1B of tube 1 with the associated retention device 12, 13. FIG. 6 to 13 then show particular aspects of various components of tube 1.

Retention device 12, 13 is designed to have two parts in this invention, with an inner support structure 13 and an outer sleeve 12. Support structure 13 consists of a web of a plurality of individual fibers 133 (see FIG. 6A to 6C); its first end 131 has a centering sleeve 14 and its second end 130 has control device 10 (see FIG. 3). Fibers 133 of support structure 13 may consist, for example, of a thermoplastic material, specifically polyethylene terephthalate (PET). The embodiment of support structure 13 as a web of separate fibers 133 with a thickness of 0.25 mm, for example, enables support structure 13 in its extended position (see FIG. 3 as well as FIGS. 4A and 4B as well as FIG. 6B) to handle forces that will secure tube 1 safely in its implanted state and that may exceed 25 N, for example.

Support structure 13 is enclosed by sleeve 12, embodied by a silicone sleeve 123 with a wall thickness of several tenths of a millimeter (see FIGS. 7A and 7B). The first end 121 of sleeve 12 is connected to the centering sleeve 14, and its second end 120 is connected to control device 10.

Thus, the first ends 121, 131 of support structure 13 embodied as a web and sleeve 12 are both connected to centering sleeve 14 and their second ends 120, 130 are connected to control device 10. Control device 10 [sic]

Centering sleeve 14 (see FIGS. 12A and 12B) consists of two cylindrical segments 140, 141, where the first end 131 of support structure 13 is inserted into port 142 of centering sleeve 14 and makes contact with interior wall 140I of cylindrical segment 140, whereas end 121 of sleeve 12 is pushed over cylindrical segment 140 and makes contact with exterior wall 140A of cylindrical segment 140. It is advantageous that both sleeve 12 and support structure 13 are firmly connected with centering sleeve 14, for example, by welding or gluing.

The distal face of control device 10 (see FIGS. 10A and 10B) has a collar 100 and the adjacent cylindrical segments 101, 102 with a reduced diameter. The second end 130 of support structure 13 is pushed over cylindrical segment 101 adjacent to collar 100 and is clamped on cylindrical segment 101 by distal sleeve 11 (see FIGS. 11A and 11B), where distal sleeve 11 is pushed onto end 130, such that cylindrical segment 110 of distal sleeve 11 surrounds the second end 130 of support structure 13 and collar 111 of distal sleeve 11 makes contact with collar 100 of control device 10. The second end 120 of sleeve 12 is in contact with the exterior of cylindrical segment 110 of distal sleeve 11, where sleeve 12 is pushed onto distal sleeve 11 and is also affixed to distal sleeve 11, for example, by welding or gluing. Likewise, the second end 130 of support structure 13, embodied as a web, is preferably also affixed to control device 10, for example, by welding or gluing.

The solid end of retention device 12, 13 over control device 10 to the distal end of tube 1 would also serve as potential grip for an endoscopy unit, if needed.

As mentioned above, tube unit 1 includes an exterior tube 16 and an interior tube 15, which are coaxial to each other. Exterior tube 16 (see FIGS. 9A and 9B) consists of a flexible and relatively solid material, such as polyurethane; its distal end 160 is pushed onto cylindrical segment 141 of centering sleeve 14, such that it is in contact with exterior wall 141A (see FIG. 12B) of cylindrical segment 141, where exterior tube 16 is preferably also glued or welded onto centering sleeve 14. Exterior tube 16 is sufficiently stiff and solid perpendicular to axial direction S that its internal stiffness provides stable access to stomach 3, when tube 1 is in place (the so-called stoma channel).

Interior tube 15 extends through the inner port 162 of exterior tube 16 through central ports 142, 132, 122 of centering sleeve 14, support structure 13 and sleeve 12, where its distal end 150 is pushed onto cylindrical segment 102 of control device 10, being affixed to control device 10 by welding of gluing, for example. Interior tube 15 (see FIGS. 8A and 8B) consists of a material, such as silicone, that is flexible axially along the axial direction S; its inner port 152 has a flow connection with port 103 on control device 10.

Whereas exterior tube 16 is thus firmly affixed to centering sleeve 14 and moreover connected with proximal ends 121, 131 of support structure 13 and sleeve 12, interior tube 15 is affixed to control device 10 and moreover connected with distal ends 120, 130 of support structure 13 and sleeve 12. Given that interior tube 150 consist of a flexible material, control device 10 can be moved along axial direction S in order to move support structure 13 from the extended position shown in FIGS. 3, 4A and 4B into the elongated position shown in FIGS. 5A and 5B in an idealized depiction.

Control device 10 is moved here by an external control device embodied as an obturator in axial direction S, thus away from distal end 160 of exterior tube 16, such that support structure 13 and thus also sleeve 12 are elongated in axial direction S between centering sleeve 14 and control device 10. In the process, interior tube 15, which is firmly affixed to control device 10, is elongated in axial direction S, such that control device 10 is now subject to a spring force that would automatically return retention device 12, 13 to its original extended position, when the control device is removed or at least when pressure is no longer exerted on control device 10.

Movement of control device 10 will not elongate exterior tube 16 in the axial direction S to elongate retention device 12, 13, such that centering sleeve 14 is essentially held in its axial position.

Interior tube 15 may be installed with some light stress such that the stress on interior tube 15 exerts some pull on support structure 13 even in the extended position, which holds support structure 13 in the extended position.

Interior tube 15 is fully contained within exterior tube 16. Support structure 13 and sleeve 12 are here positioned radially on the outside of interior tube 15, where interior tube 15 is hermetically sealed, given that distal end 150 of interior tube 15 is connected to control device 10. Thus, any nutrient liquid flowing through interior tube 15 will not come into contact with support structure 13 and will not surround the same.

Because sleeve 13 is firmly affixed to control device 10, on the one hand, and to centering sleeve 14, on the other hand, support structure 13 is also fully sealed to the outside, and it is covered, such that support structure 13 will not come into contact with tissue. Given that sleeve 12 covers support structure 13 on the outside, the outside of retention device 12, 13 has a contiguous flat surface that will provide for a suitable placement against a stomach wall, when tube 1 is used as a PEG tube.

Given that sleeve 12 provides a closed exterior surface, the risk that retention device 12, 13 will grow into the stomach wall is minimized. Moreover, retention forces can be transmitted advantageously on a wider area without exerting much force on any particular spot. The plate-like flat shape of retention device 12, 13 requires little space for retention device 12, 13 when the tube unit is in place (see FIG. 2B, for example).

Proximal end segment 17 of tube 1 is connected in each case with proximal end 151 or 161, respectively, of interior tube 15 and exterior tube 16 on the opposite ends from their distal ends 150 or 160 (see FIGS. 8A, 8B and 9A, 9B). This proximal end segment 17 is shown in FIG. 13A to 13C in various views; it includes a cylindrical segment 170, followed by a collar 172 and a cylindrical segment 171. Cylindrical segment 170 is surrounded by a row of teeth 170G, which are used to connect proximal end segment 17 to interior tube 15 and exterior tube 16. The connection is achieved by first pushing the proximal end 151 of the interior tube onto cylindrical segment 170 and the attached teeth 170G and then pushing the proximal end 161 of exterior tube 16 over cylindrical segment 170 that already supports interior tube 15, such that interior tube 15 as well as exterior tube 16 are held in position by teeth 170G of proximal end segment 17 with an expansion of their respective proximal ends 151, 161.

FIGS. 8B and 9B indicate that the ends 150, 151 or 160, 161, respectively, of interior tube 15 and exterior tube 16 are expanded in the distal connection to control device 10 or centering sleeve 14 and the proximal connection to end segment 17 when tube 1 is in position; the tension of this expansion will hold the components in position.

Interior tube 15 has a flow connection with central port 173 of proximal end segment 17, such that nutrient liquid can flow through proximal end segment 17, interior tube 15 and distal control device 10 to feed a patient. To this end, cylindrical segment 171 of proximal end segment 17 may be connected to a transfer system or a nutrient container.

FIG. 14 to 17 show various views of the interaction of tube 1 and control device 2 in the form of an obturator. Control device 2, which is not a component of tube 1, moves retention device 12, 13 from the extended position to the elongated position, such that tube 1 may be inserted into the patient in the appropriate manner via a port in the abdominal wall.

The first component of control device 2 is connector 20 for the connection with proximal end segment 17 of the tube and a handle 21 that is firmly attached to connector 20. The second component is a so-called mandrin that consists of rod 22 (also designated as mandrin rod), a thumb piece 23 and a head 24 (also designated as mandrin head). Rod 22, thumb piece 23 and head 24 are firmly linked to each other and may be inserted into interior tube 15 of tube unit 1 through connector 20 via port 210 in component 212 of handle 21.

FIGS. 16B and 16C show that head 24 is firmly connected with rod 22 by connecting segment 242 (see the exploded view in FIG. 16A).

To operate retention device 12, 13 with control device 2, connector 20 is first screwed onto proximal end segment 17 of tube 1 by a suitable screwed connection, for example, a standard connection. This connects handle 21 to proximal end segment 17. In the next step, the mandrin with head 24 and rod 22 are pushed into interior tube 15 via port 210 until head 24 makes contact with cylindrical segment 102 of control device 10, as is shown in FIG. 4B. Head 24 has a peripheral protuberance 241 on head segment 240 that will make contact with the face of cylindrical segment 102 of control device 10, when head 24 is inserted, and thus provide the means to transfer force in axial direction S between the mandrin and control device 10.

If retention device 12, 13 is to be elongated for a transfer while head 24 is inserted, the user will insert the first two fingers into handle eyelet 211 on handle 21 and presses a thumb against thumb piece 23, such that the mandrin with rod 22 and head 24 is pushed in axial direction S, where control device 10 and head 24 are pushed in axial direction S, thus elongating retention device 12, 13.

Thumb piece 23 includes detents 230, which will hold thumb piece 23 at detent protuberance 213 on component 212 of handle 21. Once retention device 12, 13 has been elongated, thumb piece 23 will be in the position depicted in FIG. 17B. Twisting thumb piece 23 with the associated mandrin will lock control device 2 into position by locking one of the detents 230 into detent protuberance 213, as shown in FIG. 17C, such that retention device 12, 13 is locked into an elongated position to facilitate insertion of tube 1 into a patient in the designated manner.

In order to return retention device 12, 13 into the extended position in order to secure tube 1 in the designated position in a patient, thumb piece 23 is unlocked from handle 21, the mandrin is removed from interior tube 15 and handle 21 is removed from proximal end segment 17 of tube 1. The elastic forces of interior tube 15 automatically return retention device 12, 13 with support structure 13 into the extended position to preclude a removal of tube 1 and to secure tube 1 in its designated position in the patient.

FIG. 18A to 18C show an alternative or augmenting embodiment of tube unit 1 with a retention device 40 and 41. FIG. 18A shows first the distal end 1B of tube 1 in its extended position with bellows 40 and spacer 41 within bellows 40. FIGS. 18B and 18C show spacer 41 and bellows 40 surrounding spacer 41. The retention device in this embodiment consists essentially of bellows 40 and spacer 41. Spacer 41 precludes bellows 40 from collapsing or failing in its extended position. The interior surfaces 40C of bellows 40 are kept separated from each other. The distal interior surface 40C of bellows 40 is associated with the distal end 1B of tube 1. The proximal interior surface 40C of bellows 40 is associated with the proximal end 1A of tube 1. As a result, a certain quantity of air will remain within bellows 40. An air cushion forms. This air cushion is sufficient to provide bellows 40 and thus the retention device with the required minimum stability. Such an embodiment can be produced at low cost. Bellows 40 provides simultaneously a sleeve for spacer 41 and an air cushion. It is preferable that bellows 40 will have the same properties as sleeve 12 described above. Reference is made to these comments to avoid repetition.

Spacer 41 is embodied as a sleeve 41 or preferably as a cylindrical hollow component 41. Sleeve 41 consists of a metal or a metallic compound. Sleeve 41 is placed at the distal end 150 of inner tube 15. Preferably, sleeve 41 will be pushed into the distal end 150 of inner tube 15 and may be glued onto it, if needed. Sleeve 41 is positioned in the interior of bellows 40. Bellows 40 extends beyond sleeve 41 on both sides. Bellows 40 will be attached on one side with outer tube 16 and on the other side with control device 10, preferably by gluing.

Sleeve 41 has two segments. It has two segments 41-1 and 41-2 with different diameters. Segment 41-2 with the smaller diameter is associated with the distal end 1B of tube 1. Thus, the exterior of sleeve 41 has an edge 41-3. Edge 41-3 makes contact with the front interior surface 40C of bellows 40 in the extended position. Edge 41-3 is a detent for bellows 41.

The idea underlying the invention is not limited to the embodiment examples discussed above, but can also be used in totally different embodiments. Specifically, the use of a tube of the type described here is not limited to percutaneous endoscopic gastrostomy, but the tube can be used without an essential modification also for Jet PEG or PEJ, for example. Characteristics of specific embodiments and the characteristics listed in the general part of the description may be substituted among and between subjects.

LIST OF REFERENCE NUMBERS

1 Tube
1A Proximal end
1B Distal end
10 Control device
100 Collar
101, 102 Cylindrical segment
103 Port
11 Distal sleeve
110 Cylindrical segment
111 Collar
12 Sleeve
120, 121 End
122 Port
123 Sleeve component
13 Support structure (web)
130, 131 End
132 Port
133 Fibers
14 Centering sleeve
140 Cylindrical segment
140A Exterior wall
140I Interior surface
141 Cylindrical segment
141A Exterior surface
142 Port
15 Interior tube
150 Distal end
151 Proximal end
152 Port
16 Exterior tube
160 Distal end
161 Proximal end
162 Port
17 Proximal end segment
170 Cylindrical segment
170G Teeth
171 Cylindrical segment
172 Collar
173 Port
2 Control device (Obturator)
20 Connector
21 Handle
210 Port
211 Handle eyelet
212 Component
213 Detent protuberance
22 Rod
23 Thumb piece
230 Detent
231 Pressure area
24 Head
240 Head segment
241 Protuberance
242 Connecting segment
3 Stomach
30 Dermal layer
31 Stomach wall
32 Port
40 Bellows or air pillow
40C Interior surface of the bellows
41 Spacer or sleeve
41-1 Rear segment of the sleeve
41-2 Front segment of sleeve with smaller diameter
41-3 Edge on exterior of sleeve
D1, D1', D2 Diameter
E Direction of insertion
S Axial direction

The invention claimed is:

1. A tube unit for the enteral feeding of a patient, the tube unit including a tube segment that extends along at least a segment of the tube unit and along an axial direction (S), the tube segment having a proximal end and a distal end, and a retention device disposed on the distal end of the tube segment, the retention device including:

a retention device body including a first end attached to the distal end of the tube segment and a second end, and a control device attached to the second end of the retention device body, the control device including a first opening, wherein the retention device body extends in at least one direction radially to the axial direction (S) beyond the distal end of the tube segment when the retention device is in an extended position and which has a smaller diameter when the retention device is in an elongated position, in which the retention device body is elongated along the axial direction (S), where the movement of the retention device from the extended position into the elongated position is supported by the control device, wherein the tube segment includes an interior tube and an exterior tube surrounding the interior tube, the interior tube having a proximal end and a distal end, the distal end of the interior tube extending through the retention device body and being attached to the control device such that fluid can pass through a second opening at the distal end of the interior tube and out of the tube unit via the first opening of the control device, the interior tube being elastically deformable in a direction along the axial direction (S) such that the control device is movable relative to the exterior tube along the axial direction (S) to move the retention device from the extended position to the elongated position.

2. The tube unit of claim 1, wherein a proximal end of the exterior tube and the proximal end of the interior tube are connected to a proximal end segment of the tube unit.

3. The tube of claim 2, wherein the interior tube is under elastic stress in the elongated position and under no stress in the extended position relative to the elongated position.

4. The tube unit of claim 2, wherein the interior tube is in a flow connection with a port of the control device.

5. The tube unit of claim 2, wherein no leakage from the interior tube to the exterior tube occurs and the retention device is placed radially outside of the interior tube.

6. The tube of claim 1, wherein the interior tube is under elastic stress in the elongated position and under no stress in the extended position relative to the elongated position.

7. The tube unit of claim 6, wherein the interior tube is in a flow connection with a port of the control device.

8. The tube unit of claim 6, wherein no leakage from the interior tube to the exterior tube occurs and the retention device is placed radially outside of the interior tube.

9. The tube unit of claim 1, wherein the interior tube is in a flow connection with a port of the control device.

10. The tube unit of claim 1, wherein no leakage from the interior tube to the exterior tube occurs and the retention device body is placed radially outside of the interior tube.

11. The tube unit of claim 1, further comprising a support structure in the retention device and a sleeve surrounding the support structure.

12. The tube unit of claim 11, wherein the support structure is embodied as a web.

13. The tube unit of claim 12, wherein the web includes at least one fiber.

14. The tube unit of claim 13 wherein the at least one fiber includes a thermoplastic material selected from a group including: polyester, polyethylene terephthalate or a textile material.

15. The tube unit of claim 1, wherein the retention device body includes a bellows having a proximal and a distal interior surface and a spacer in the bellows for separating the proximal interior surface and the distal interior surface of the bellows.

16. The tube unit of claim 15, wherein the spacer is embodied as a sleeve with two segments, which is pushed onto the distal end of the interior tube.

17. The tube unit of claim 16, wherein the sleeve or the bellows include silicone or a compound including silicone.

18. The tube unit of claim 16, wherein a support structure and the sleeve or the spacer and the bellows each have one end connected to the distal end of the tube segment and the other end connected to the control device that is movable relative to the distal end of the tube segment.

19. The tube unit of claim 15, wherein the bellows are embodied as a separate component from the spacer, the bellows completely enclosing the spacer to the outside.

20. The tube unit of claim 1, wherein an external shape of the retention device in the extended position is substantially circular—viewed in a top view along the axial direction (S)—and is concentric to the distal end of the tube segment, with a diameter that exceeds a diameter of the tube segment on its distal end.

21. The tube unit of claim 1 wherein the interior tube has a first elasticity, the tube segment has a second elasticity, and the first elasticity is greater than the second elasticity.

* * * * *